Patented Mar. 18, 1941

2,234,949

UNITED STATES PATENT OFFICE 2,234,949

MODIFICATION OF THE PHYSICAL PROPERTIES OF ORGANIC ISOCOLLOIDS

Laszlo Auer, Jackson Heights, N. Y., assignor to J. Randolph Newman, Washington, D. C., as trustee No Drawing. Application April 21, 1930, Serial No. 446,170. Renewed January 27, 1939. In Great Britain April 24, 1929

24 Claims. (Cl. 260—407)

The present invention relates to the modification of the physical properties of organic isocolloids and it comprises processes wherein the physical properties, such as viscosity, melting point, etc., of organic isocolloids, such as fatty oils, etc., are modified with the aid and by means of amine compounds, advantageously aromatic diamine compounds. By "isocolloids" or "isocolloid substances," I mean organic colloids or colloidal substances whereof the dispersed phase and the dispersion medium of the colloidal system are both of the same chemical composition but in a different state.

By the present processes, modified organic isocolloid products can be prepared from various fatty oils and like organic isocolloids. And starting materials, suitable for modification by the present invention, are fatty oils, such as tung oil, linseed oil, fish oils (train oils), poppyseed oil, sunflower oil, cottonseed oil, rapeseed oil, soya bean oil, corn oil, olive oil, castor oil, etc., and glycerides containing resin and fatty acids, and their derivatives, animal and vegetable waxes, etc., as well as other organic isocolloids.

My present application is a continuation-in-part of my prior application Serial No. 359,425, filed April 30, 1929, which matured into Patent No. 2,213,944 on September 10, 1940. In turn, said application Serial No. 359,425 is a continuation-in-part of my earlier application Serial No. 143,786, filed October 23, 1926, which matured into Patent No. 2,189,772 on February 13, 1940.

In addition to my said Serial No. 359,425, several other continuations-in-part of my said Serial No. 143,786, have been filed by me, including the following applications:

| Ser. No. | Filed | Patent No. | Issued |
|---|---|---|---|
| 273,160 | Apr. 26, 1928 | 1,985,231 | Dec. 25, 1934 |
| 359,424 | Apr. 30, 1929 | 2,007,958 | July 16, 1935 |
| 359,426 | Apr. 30, 1929 | 1,980,366 | Nov. 13, 1934 |
| 359,427 | Apr. 30, 1929 | 1,957,437 | May 8, 1934 |

In my said application Serial No. 143,786 and the said continuations-in-part thereof, mentioned ante, I have described processes wherein the physical properties of natural and artificial isocolloids containing unsaturated carbon compounds are modified by treating them with certain agents called in this specification "modifying agents."

Such modifying agents are "electrolytes" or polar compounds, such as salts of organic and inorganic acids, organic and inorganic acids, metallic derivatives of organic compounds, etc., as disclosed in my Serial No. 143,786. And as disclosed in my Serial No. 359,425, organic polar compounds comprising within the molecule an acidic inorganic residue and an organic residue, are advantageous modifying agents in my processes. By an acidic inorganic residue, I mean such an inorganic residue as can be converted by the addition of one or more hydrogen atoms into an inorganic acid, (including carbonic acid as inorganic).

It will be seen from the above definition (and from the disclosure in my Serial No. 359,425) that this generic class of compounds or modifying agents includes such compounds as (1) organic halogen derivatives, (2) organic sulphonic acids and their halides and salts, including esters thereof, (3) esters of inorganic acids and (4) inorganic salts of organic bases.

Of the organic halogen derivatives, the following compounds are typical examples:

Tri-chloracetic acid
Mono-chloracetic acid
Chloral hydrate
Iodoform
o-Dichlorobenzene
p-dichlorobenzene
Tri-chlorobenzene
p-Dichlorobenzene
4-chloro-o-anisidine
Naphthalene tetrachloride
Pinene hydrochloride
Triphenylchloro-methane
Benzyl chloride
Benzoyl chloride
Acetyl chloride Of the organic sulphonic acids and their halides and esters, the following compounds are typical examples of this class of modifying agent:

Sodium 2:6:8 naphthylaminedisulphonate
Sodium 2:6:8 naphtholdisulphonate
Sodium 1:8:3:6 aminonaphtholdisulphonate
Sodium 1:5 naphtholsulphonate
Sodium 2:3:6 naphtholdisulphonate
Sodium 2:6 naphtholsulphonate
2:6 naphtylaminesulphonic acid
2:1 naphthylaminesulphonic acid
2-phenylamino-8-naphthol-6-6-sulphonic acid
Beta-naphthylamine 3:6:8 trisulphonic acid
Beta-naphthol 3:6:8 trisulphonic acid
Beta-naphthol 1:5 disulphonic acid
Naphthalene 2:6 disulphonic acid
Naphthalene 1 sulphonyl chloride
Alpha-naphthyl sulphamic acid
m-Xylidine sulphonic acid
Benzene sulphonic acid
p-Toluene sulphonic acid
p-Toluene sulphonyl chloride
5-sulpho salicylic acid
p-Toluidine m-sulphonic acid
Benzene sulphonyl chloride
2:5 dichlor benzene sulphonic acid
Methyl ester of p-toluene sulphonic acid
Ethyl chlorsulphonate Of the esters of inorganic acids, the following compounds are typical examples of such modifying agents:

Dimethyl sulphate
Triphenyl phosphate
Tricresyl phosphate
Nitrocresol carbonates Of the inorganic salts, the following compounds are typical examples:

m-Nitroaniline hydrochloride
Diaminodiphenylamine sulphate
Amino-azo-benzene sulphate
Diphenylamine sulphate
Diphenylamine hydrochloride
Diphenyl-amine hydrobromide
Diphenylamine trichloracetate
Trichloraniline hydrochloride Further examples are o-nitrophenol, p-nitrophenol, p-nitro acetanilide, dinitraniline, fluoresceine, eosin, thiocarbanilide, 4:4¹-diamino-diphenyl sulphide, diphenyl sulphone. Further modifying agents are certain metallic peroxides, e. g. peroxides of magnesium, zinc, barium, strontium, calcium, sodium etc., alkali metals, their oxides and hydroxides etc. In certain cases more than one of the modifying agents may be used such, for instance favorable results are obtained by treating the starting material with an alkali metal, its oxide or hydroxide and with a metal peroxyde. The given list of modifying agents shall not be a complete one as other agents giving the desired results may be used for the said purpose.

The modifying agents should be added to the starting material in a dry form (without the presence of water) and in relatively small quantities. In order to ensure complete dissolution or dispersion of the modifying agent, the operation of dissolving or dispersing the latter should be carried out under application of heat. The degree of heat necessary depends upon the nature of the substance under treatment and also of the modifying agent used. Generally temperatures from 100 to 300° C. or more will give satisfactory results. The heat treatment promotes the complete (molecular or colloidal) dissolution of the modifying agent in the substance to be treated. In some cases it may be advisable to continue the heat treatment after the dissolution or dispersion of the modifying agent is substantially complete.

I have further found that the results of the process vary with the nature and/or with the physical condition (pressure) of the gas (air or other gas) present in the reaction chamber. Thus, I have found that a certain given starting material which is initially liquid will become viscous only as the result of the electrolyte treatment, if the latter is effected under atmospheric pressure (e. g. in an open vessel), but solid if the gas is rarefied by the employment of a partial vacuum. In other cases the converse applies. When plus pressure was used (e. g. caused by the tension of the starting materials at higher temperatures), the results differ again from both of those of the treatments under atmospheric pressure and vacuum. Also, as to the nature of the gas present, air gives for instance a different result from another gas, or mixture of gases. The pressure conditions may also be alternated during the gas treatment which, of course may be carried out together with the dissolution or dispersion of the modifying agent in the substance to be treated or as an after-treatment.

It may be stated with reference to the action of gases that generally speaking rarifaction of the gases present in the reaction chamber by reduction of pressure tends to intensify their action in the process both in the case of solidification of the starting material and also in the case of liquefaction thereof.

The gas treatment may be carried out by blowing the gas through the reaction mixture or simply by passing it over the mass contained in the reaction chamber. The gas may be further produced in situ in the reaction mass by using substances which under the conditions of the reaction develop gases as desired. Such, for instance, by using peroxydes, carbonates, sulphides, sulphites and the like the corresponding gases may be developed in the reaction mass.

The process as described may be made to effect a solidification or a liquefaction of the initial material. Thus, for instance, thickened products and even solid substances like hard rubber may be obtained from thin oils. Similarly I have found that resins either soft or liquid or of any intermediate stage of viscosity may be obtained from solid resins. The results, namely, solidification on the one hand, or liquefaction on the other, depends in any given case upon the conditions of the reaction, e. g. upon the duration of the heat-treatment of the material, the duration of the gas-treatment, the quantity of the dissolved modifying agent, etc. Generally speaking the products obtained were, from liquids, solid or semi-sold thermoplastic masses, and from solids, pasty or thin liquids.

If desired, the modifying agent may be produced in situ within the mass of the substance under treatment by interaction within the substance, of substances capable of reacting under the conditions of the process to produce the modifying agent wanted.

The dissolution or dispersion of the modifying agents in the starting material may be favorably influenced by the addition of certain "auxiliary agents" or "sensitisers." These fall into two groups, namely the purely inorganic (e. g. silica gel, fuller's earth), and the purely organic (e. g. formaldehyde, phenol, thiocarbanilide, benzidine, hexamethylenetetramine, 2:3-hydroxynaphthoic acid, α-naphthol, quinoline, pyrogallol, benzene, glycerol and phthalimide). The specific examples of auxiliary agents here mentioned are to be taken as typical of the substances which have been successfully used for this purpose and not as comprising all the effective substances. It should be mentioned that quite a number of the modifying agents comprising within the molecule an acidic inorganic residue and an organic residue are auxiliary agents (sensitisers) when used in conjunction with other modifying agents. By an acidic inorganic residue I mean such an inorganic residue as can be converted by the addition of one or more hydrogen atoms, into an inorganic acid (including carbonic acid as inorganic). Thus, e. g. the dissolution of 5% of sodium bisulphite in linseed oil is facilitated and the color of the product is made lighter by the addition of say 2% of such compounds as amino-azobenzene sulphate, aniline sulphate, nitro cresyl carbonate, dimethyl sulphate, trichloroacetic acid, benzenesulphonic acid, iodoform, naphthalene tetrachloride, pinene hydrochloride, m-xylidine-sulphonic acid, β-naphthylamine-6:8-disulphonic acid, β-naphthylamine 6-sulphonic acid, acetyl chloride, p-nitroacetanilide, chloral hydrate, and triphenyl phosphate, naphthalene-1-sulphochloride, diphenylamine hydrobromide, 5 (or 3)-amino salicylic acid, 2:6-naphthalene disulphonic acid, o-dichlorobenzene.

The advantages of a rapid dissolution of the modifying agent are greatest in those cases where a clear, pale or colorless product is desired, especially for example, for the varnish industry.

For the modification of the physical properties of the initial materials solutions or colloidal solutions of one or more electrolytes in an organic solvent may be used.

Solid coherent and elastic products may be obtained, similar in general characteristics to ordinary rubber, by adding sulphur to the initial substance in addition to the agents already mentioned. The sulphur may be added as such or in the form of a sulphur compound (e. g. sulphur chloride) which under the conditions of the process decomposes with liberation of nascent sulphur. It would appear that the action of the sulphur is analogous to that which takes place in the vulcanisation of rubber. The sulphur or sulphur compounds may be added either at the beginning of the process or so as to act only during the gas treatment part of the process. Alternatively, the sulphur or sulphur compounds may be added to the material after the main reaction of the process has been completed. Alternating treatment with sulphur dioxide and hydrogen sulphide has been found to be specially useful in certain cases. The vulcanising treatment results from the formation of sulphur in situ.

In the vulcanisation activators (e. g. zinc oxide), and accelerators, such as triphenylguanidine, mercaptobenzthiazole, tetraethylthiuram disulphide, may be advantageously used. If superaccelerators (e. g. piperidine pentamethylenedithiocarbamate, diethylammonium diethyldithiocarbamate etc.) are added, vulvanisation occurs below 100° C.

The modified materials produced by these processes may be used in a variety of industries, e. g. in the rubber, linoleum, varnish, soap and candle industries and others.

A very important application of the new products is the manufacture of new artificial materials by emulsification of organic isocolloids. One of the emulsification processes consists in subjecting the isocolloid first to a treatment with modifying agents of the kind described and thereafter effecting further transformation by emulsification or dispersion in an aqueous medium. Or, the isocolloid may be first emulsified or dispersed in an aqueous medium and thereafter treated with one or more of the above characterised agents which are capable to modify the physical properties of the starting material. The emulsions or dispersions may be vulcanised or sulphurised by one of the above described methods. The emulsions or dispersions obtained, whether vulcanised or not, are valuable in the art for a variety of purposes. They may be for example concentrated and used for impregnation of textiles; or the disperse phase may be separated in solid form by means of the usual coagulating agents, or by drying (as e. g. when the aqueous dispersions are used for varnishes), or it may be deposited on forms by dipping (in which case it is advantageous to cover the form with a coat containing a coagulant), or by electrophoresis; or the disperse phase may be separated from the dispersing medium by ultrafiltration. The emulsion may be used alone or in admixture with natural rubber latex or an artificially prepared emulsion of rubber, which may or may not have been previously vulcanized, in any or all of the above treatments, and for any of the purposes mentioned.

In all cases the treatment may be profitably influenced by exposing the materials undergoing treatment to ascillating energy (X-rays, ultra-violet rays, infrared rays, etc.) or by including the reaction chamber in an electric circuit.

Filling materials, pigments and the like may be added at any stage of the processes.

The modification of the physical properties of the above products is supposed to be to a colloidal chemical change in their physical structure. Such changes are generally partial or complete sol-gel changes (gelatinisations), or partial or complete gel-sol changes (peptisations). It has been found that in those isocolloids in which the concentration of the disperse phase is not high enough (e. g., in certain fatty oils), it is necessary to increase this concentration by some means, for instance by heating, to obtain a satisfactory colloid chemical change. If the disperse phase concentration is sufficiently high, a simple dissolution of the modifying agents seems to be able to produce the desired modification. For this purpose it is very important that the modifying agent should be easily soluble in the starting material.

In the present invention I use similar procedures, but employ as the modifying agent, new modifying agents which are easily soluble in the organic isocolloidal systems. Such modifying agents are the aromatic amines, for instance, benzidine, p-phenylenediamine, betanaphthylamine, etc. It has been found that diamines especially and amines with high molecular weight act satisfactorily; of these, the following may be particularly mentioned:

Dianisidine
pp-Diamino-diphenylmethane
pp-Diaminodiphenylamine
pp-Diaminobenzophenone
pp-Diaminodiphenyl ether
pp-Diaminodiphenyl sulphide (thioaniline)
pp-Diaminodiphenylurea
pp-Diamino-diphenylthiourea
m-Phenylenediamine
Alpha-naphthylamine
Michler's ketone
Michler's hydrol
Benzylethylanilinesulphonic acid
Safranine
1:4-diaminoanthraquinone
o-Phenylenediamine
Diaminodihydroxyanthraquinonedisulphonic acids
Diaminotetra-hydroxyanthraquinonedisulphonic acids
p-Tolylenediamine
p-Diaminodimethylcarbazole
Eurhodine
Diaminodiphenazine
Diaminofuchsonimine My invention may be applied in various ways. In those cases in which the concentration of the disperse phase of the isocolloid system is high enough, the isocolloid may be melted together with the modifying agent until the melt forms a clear homogeneous mass after cooling. In other cases (linseed oil, for instance) in which the disperse phase concentration must be increased by a heating process, it is necessary to heat for a longer time to higher temperatures (250–300° C.) in order to bring about the necessary increase of the disperse phase concentration. The products of the reaction vary in the case of any one definite starting material according to variations made in the nature of the modifying material, to the percentage of the modifying agent used, to the duration of heating, to the reaction temperature, to the nature and physical state (pressure) of the gas present in the reaction chamber etc. The reaction may be further influenced by irradiation with shortwave oscillating energy (ultraviolet rays, X-rays, etc.), or by the addition of a small amount (generally not more than 5% on the weight of the starting material) of secondary purely organic (metal-free) reagents such as aldehydes, phenols, alcohols, ketones, hydrocarbons etc. It is further possible to use the above described reagents, i. e., the aromatic amines, in combination with any modifying agent described in any one of the above mentioned specifications—e. g. with organic or inorganic acids, with salts, with organo—metallic compounds, with compounds comprising within the molecule an acidic inorganic residue and an organic residue, etc. The application of an electric potential within the reaction mass influences favorably the reaction.

A small percentage of the modifying reagent is sufficient in the most cases to cause the desired modification. Generally 1–10% of the modifying agent should be added, but in certain cases satisfactory results may be obtained with less than 1% or more than 10% of the modifying agent. During the modification process the iodine value of the starting material and in the case of fatty oils also the saponification value and in certain cases the acid value decreases.

The uses of the products obtained according to my invention are various. Most of the products give varnishes having very satisfactory water-resisting properties, as the reagents used in the reaction are themselves only very slightly soluble in water. When vulcanised they yield satisfactory rubber substitutes.

The aromatic amines are also suitable modifying agents to be used in one of the processes above described, wherein in the first instance organic isocolloids are modified or partly modified by treatment with modifying agents and thereafter further transformation is effected by emulsification or dispersion in an aqueous medium with or without the aid of emulsifying or dispersing agents and/or protective colloids. According to the present invention in the first step of this process aromatic amines can be used as modifying agents. Arylamines are also satisfactory modifying agents to be used in that of the processes described, wherein the starting material is first emulsified in an aqueous medium and thereafter the emulsion is treated with a small amount of an aromatic amine.

In carrying out the vulcanisation I may proceed in that way that the sulphur is first dispersed or distributed through the material to be vulcanised to effect initial vulcanisation and thereafter the sulphur-containing material is dispersed or emulsified or otherwise brought into intimate contact throughout the mass to be vulcanised with an aqueous medium and in this condition subjected to a suitable temperature until the desired degree of vulcanisation is attained.

The last mentioned vulcanising process may be modified by first treating the material to be vulcanised with vulcanising reagents to effect initial vulcanisation and thereafter forming an aqueous emulsion or suspension of the incompletely vulcanised material and subjecting it in this condition to a suitable temperature and pressure until the desired degree of vulcanisation is attained. In these cases also, the emulsification may be carried out with the aid of the usual emulsifying agents (for example a sulphonated oil) and with or without further addition of protective colloids.

In many cases the vulcanisation process is greatly facilitated and leads to improved products by application of steam during vulcanisation or upon the completion thereof.

Products obtained by processes described in the present specification may be advantageously vulcanised and used in the vulcanised condition in the rubber trade (especially as rubber substitute made from modified oil products obtained according to the present process), or in the varnish trade as varnish raw materials, (e. g. vulcanised oil products and resin products).

The vulcanisation may be advantageously influenced by the use of accelerators, e. g. mercaptobenzthiazole, and/or activators, e. g., zinc oxide. If desired, pigments and/or fillers may be added at any convenient stage.

My invention is illustrated but not limited by the following examples, in which the parts are by weight.

*Example 1*

300 parts of linseed oil are heated under vacuum to 280–300° C. with 15 parts of benzidine base for 5 hours. The product is pored into molds and on cooling forms a fairly hard solid suitable for use in the rubber and varnish trade.

*Example 2*

300 parts of linseed oil are heated as described in Example 1 with 15 parts of p-phenylene diamine. The product is similar to that obtained in Example 1.

*Example 3*

300 parts of linseed oil are treated as described in Examples 1 and 2, with 20 parts of alpha-naphthylamine. The product is a very viscous liquid, having modified properties.

If beta-naphthylamine is used in place of alpha-naphthylamine the viscosity of the product is much less than of the product given with alpha-naphthylamine, but is greater than that of linseed oil stand oil prepared under the same conditions but in the absence of modifying agents.

*Example 4*

If in Example 2, m-phenylenediamine is used in place of p-phenylenediamine the product is an oil having a viscosity somewhat greater than that of stand linseed oil prepared by heating linseed oil alone under the same conditions, but without the use of modifying agents.

*Example 5*

300 parts of linseed oil stand oil are heated with 15 parts of benzidine base for 4 hours at 200° C. The resulting product is a stiff, hardly fusible mass, to be used as such, or after being vulcanised as a rubber compounding ingredient.

In the above examples which are illustrative of my generic processes, in lieu of the particular isocolloid substances and particular amine used, the other isocolloid substances and specific amines previously described may be employed in a like manner. Likewise, the ratios and temperatures may be varied within the ranges specified ante. In this way a wide range of useful products may be obtained within the broad scope of this invention, each having its own advantageous properties and uses as shown generally in the broad disclosure theretofore set forth.

What I claim is:

1. As an improvement in modifying the properties of organic isocolloid materials, the improvement which comprises dispersing a minor amount of a diaminodiaryl-urea compound in said organic isocolloid material by mixing 2 to 10 per cent of said diaminodiaryl-urea compound with said organic isocolloid material and heating the mixture to temperatures between 100° and 300° C. until said urea compound is dispersed in the said organic isocolloid substance and said isocolloid material is modified thereby, thus altering the properties thereof.

2. In the manufacture of modified bodies from fatty oils, the process which comprises mixing together 100 parts of said oil and between 2 to 10 parts of an aromatic diamine compound and heating the mixture to a temperature between 250° and 300° C. until a modified heat-bodied oil product is obtained, said heating being effected under a substantial vacuum thereby facilitating the action of the amine on the oil.

3. The process of claim 2 wherein said fatty oil is a drying oil and said amine is a diaminodiaryl urea compound.

4. The process of claim 2 wherein said fatty oil is linseed oil and said amine is diaminodiphenyl urea.

5. The process which comprises mixing 100 parts of linseed oil with 5 parts of diaminodiphenyl urea and heating the mixture under vacuum to between 250° and 300° C. until upon cooling a solid modified heat-bodied product is obtained.

6. The process which comprises mixing a diaminodiaryl-urea compound with a fatty oil and heating the mixture to between 250° and 300° C. until a modified, heat-bodied oil product is obtained.

7. The process of claim 6 wherein said diamino urea compound is diaminodiphenyl urea.

8. In the manufacture of modified, heat-bodied products useful in varnishes, etc., from glycerides containing unsaturated carbon compounds, the improved process which comprises heat-bodying the said glyceride in the presence of an aromatic diamine urea compound having each amine group attached to a separate benzene nuclei and having the following structure

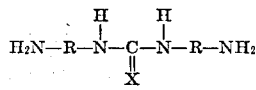

wherein R represents a benzene nucleus and X represents a divalent atom of the class consisting of S and O, said heat-bodying being effected at temperatures between 200° and 300° C.

9. The process of claim 2 wherein the said heating of the said mixture of fatty oil and aromatic diamine compound is continued at said temperatures until upon cooling a solid, modified heat-bodied oil product is obtained.

10. As a new product, the solid modified heat-bodied oil product obtained by the process of claim 5, the said solid product containing more than one per cent of said amine dispersed therein, the said amount of said amine influencing the dispersed phase of said heat-bodied oil product.

11. The process of claim 2 wherein said aromatic diamine compound is benzidine.

12. In the manufacture of bodied oil products from fatty oils, by improved two step procedures, the improvement which comprises first partially heat-bodying the fatty oil by a known method until the oil has a relatively high concentration of dispersed phase to thus obtain a stand oil, and then further bodying the said partially heat-bodied product so obtained, in the presence of an amine compound by heating a mixture of the said partially heat-bodied oil product and the amine compound to a temperature sufficient to heat-body the same, until a modified, heat-bodied oil product of the desired heavy body is obtained, the amine compound being used in minor amount and being capable of facilitating the heat-bodying of said oil and of modifying the properties thereof.

13. In the manufacture of heavily bodied oil products from fatty oils, the improvement which comprises first partially heat-bodying the fatty oil and then further heat-bodying and modifying the partially heat-bodied oil product by mixing an amine compound with the partially bodied oil so obtained and heating the mixture to between 200° and 300° C. until said amine compound is dispersed in said oil and until a modified, thickened, heat-bodied oil product is obtained, said amine being capable of facilitating the bodying of said oil and of modifying the properties thereof.

14. The process of claim 2 wherein the fatty oil employed as the starting material therein is a linseed oil stand oil.

15. As a new and improved solid, heat-bodied fatty oil product, useful in making water-resistant varnishes and in making solid, vulcanized products suitable as rubber substitutes, an improved solid, modified, heat-bodied, drying fatty oil product containing 2 to 10 per cent of an amine compound dissolved in the heat-bodied fatty oil, the amount of said amine compound being sufficient to modify the properties of the said heat-bodied drying oil and said solid, modified heat-bodied drying oil having an acid value, iodine value and saponification value less than those of the original drying oil.

16. In the manufacture of solid, modified, heat-bodied oil products from linseed oil, the improved process which comprises heating 100 parts of linseed oil with 2 to 10 parts of benzidine to temperatures between 250° and 300° C. and continuing the heating of the mixture at said temperatures until a solid, modified, heat-bodied oil product is obtained upon cooling.

17. In the manufacture of solid, modified, heat-bodied fatty oil products from linseed oil and like drying oils, the improved process which comprises mixing 100 parts of a drying fatty oil with 2 to 10 parts of an aromatic diamine, heating the mixture to temperatures between 250° and 300 C. and continuing the heating at said temperatures until a solid, modified, heat-bodied fatty oil product is obtained upon cooling, said heat-bodied oil product containing between 2 to 10 per cent of an amine compound dissolved therein to modify the properties of said heat-bodied fatty oil.

18. In the manufacture of solid, vulcanized, modified, heat-bodied fatty oil products from linseed oil and like drying oils, the improved process which comprises mixing 2 to 10 per cent of an aromatic diamine with a drying fatty oil, heating the mixture to temperatures between 250° and 300° C. until the said amine is dispersed in the oil and continuing the heating at said temperatures until a solid, modified, heat-bodied oil product containing 2 to 10 per cent of an amine compound dissolved therein is obtained upon cooling and then further modifying the modified, heat-bodied oil product so obtained by mixing sulphur with said modified, heat-bodied oil product and further heating the mixture containing both sulphur and an amine compound admixed with the heat-bodied oil at vulcanizing temperatures until a solid, vulcanized, modified, heat-bodied fatty oil product is obtained upon cooling.

19. The process of claim 18 wherein said aromatic diamine is benzidine.

20. In the manufacture of solid, vulcanized, modified, heat-bodied oil products from fatty oils containing unsaturated carbon compounds and capable of being altered by heating to temperatures above 200° C., said modified, heat-bodied oil products having a body, solidifying point and other physical properties different from those of the original fatty oil, the improved process which comprises mixing the said fatty oil with 2 to 10 per cent of an amine compound capable of effecting the relations between the phases of the fatty oil, heating the mixture to temperatures between 250° and 300° C., continuing the said heating until the internal structure of the fatty oil is sufficiently altered to change said physical properties and a modified, heat-bodied fatty oil containing a minor amount of an amine compound dissolved therein is obtained, the amount of amine compound being sufficient to modify the properties of the said heat-bodied oil, and then vulcanizing the modified, heat-bodied fatty oil product to further change its properties by adding sulphur to said modified, heat-bodied oil product and heating the mixture until a solid, vulcanized, modified, heat-bodied fatty oil product is obtained upon cooling.

21. As a new composition of matter, useful as an improved rubber substitute and as a rubber compounding ingredient and in making improved varnishes and coating compositions, an improved solid, vulcanized, modified, heat-bodied fatty oil containing a minor amount of an amine compound dissolved therein, the amount of the amine compound being between 2 to 10 per cent and being sufficient to substantially modify the properties of said vulcanized, heat-bodied fatty oil, said solid, vulcanized, modified, heat-bodied fatty oil being resistant to water.

22. The process which comprises mixing a fatty glyceride with a minor amount of an amine and an aldehyde, heating the mixture to between 200° and 300° C. and continuing the heating until a modified product of increased body is obtained, the amount of said amine being between 2 to 10 per cent and the aldehyde being capable of facilitating the action of the amine upon the said glyceride when the said mixture is heated.

23. In the manufacture of solid, modified oil products from glycerides capable of being heat-bodied, the steps which comprise mixing said glyceride with between 2 to 10 per cent of an amine compound and an aldehyde capable of facilitating the action of the amine upon the said glyceride when the mixture is heated, heating said mixture to a temperature sufficient to heat-body the same, said temperature being between 250° and 300° C., and continuing the heating until upon cooling a solid, modified product is obtained.

24. The process of claim 2 wherein an aldehyde as a sensitizer is added to said fatty oil, in addition to the said aromatic diamine compound, to facilitate the action of the said amine when the mixture is heated to said temperature.

LASZLO AUER.